(No Model.) 2 Sheets—Sheet 2.
E. OXLEY.
METHOD OF AND APPARATUS FOR MULTIPLE METERING OF ELECTRIC CURRENTS.
No. 595,821. Patented Dec. 21, 1897.
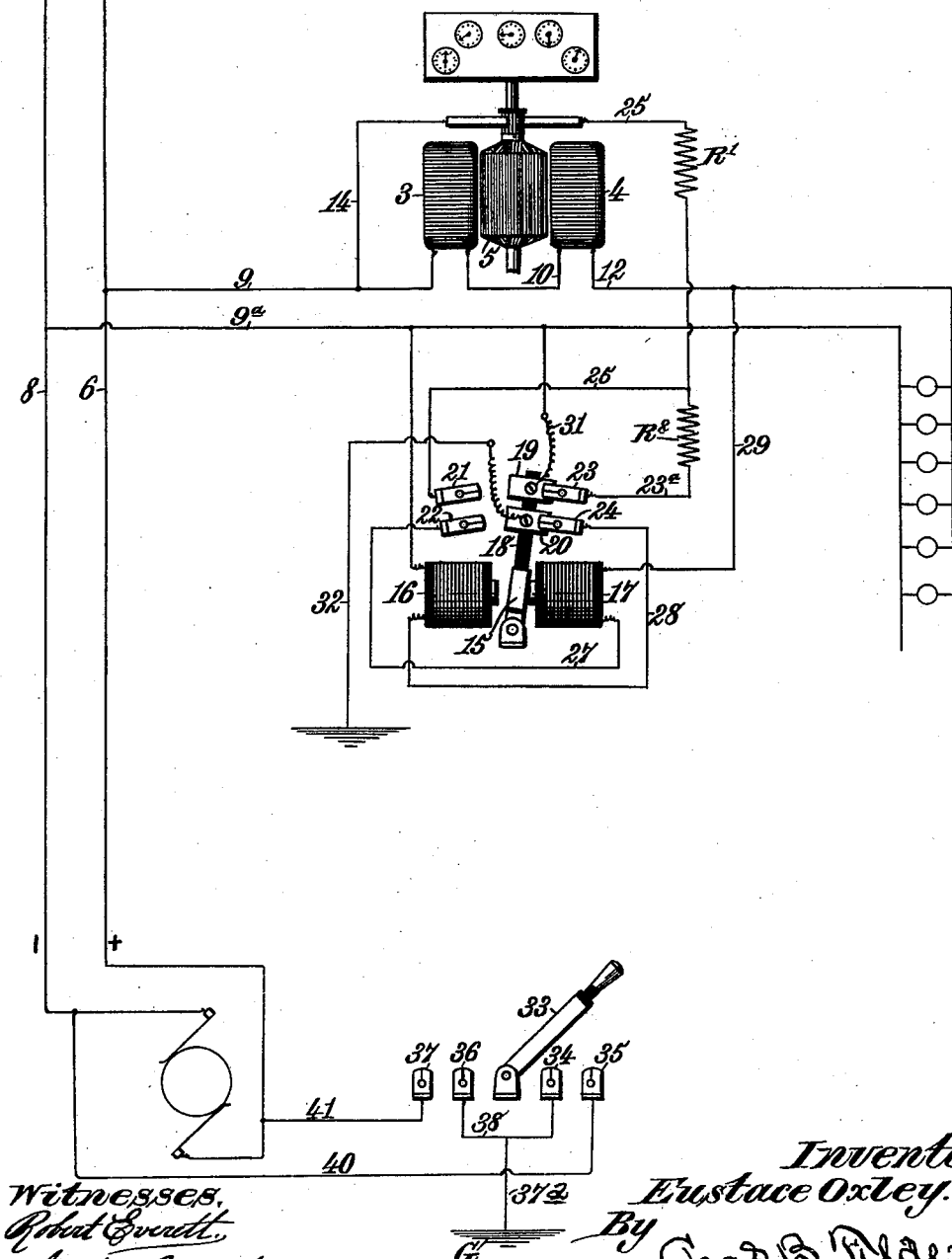
Witnesses,
Robert Everett
Geo. M. Cofenhaver
Inventor:
Eustace Oxley.
By Chas. B. Blair
Atty.

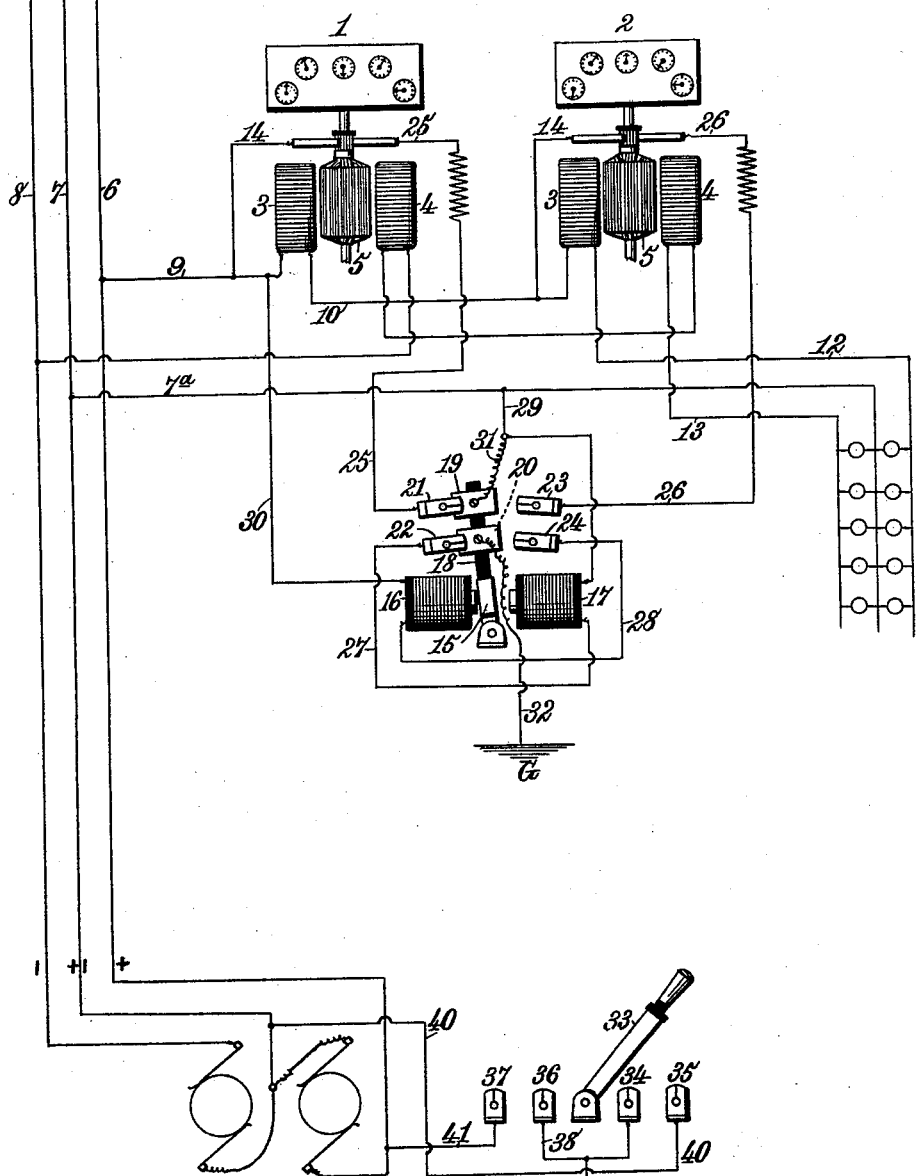

UNITED STATES PATENT OFFICE.

EUSTACE OXLEY, OF WASHINGTON, DISTRICT OF COLUMBIA.

METHOD OF AND APPARATUS FOR MULTIPLE METERING OF ELECTRIC CURRENTS.

SPECIFICATION forming part of Letters Patent No. 595,821, dated December 21, 1897.

Application filed October 25, 1897. Serial No. 656,351. (No model.)

*To all whom it may concern:*

Be it known that I, EUSTACE OXLEY, a subject of the Queen of Great Britain, residing at Washington, in the District of Columbia, have invented certain new and useful Improvements in Methods of and Apparatus for Multiple-Rate Metering of Electric Currents; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My present invention relates to methods of and apparatus for the multiple-rate metering of electric currents, whereby a generating company is enabled to popularize and extend the use of electricity, to increase the output and the dividend-producing capacity of a generating plant, and by improving the load factor reduce the cost of generation so far, under favorable conditions, as to permit a successful competition with gas and steam for light and power.

It is my purpose in this instance to provide means whereby a company generating and distributing electricity shall be able to offer a special or reduced rate during a number of hours in each day, and thus avoid the necessity of letting the generating plant lie idle during the daylight hours, or practically so.

My present invention is adapted to all systems whether using two wires or three wires, but is particularly convenient in systems in which the mains are piped and buried in the ground, as is the case in some places in the Edison system. These mains being usually covered by asphalt and other pavements it is troublesome and expensive to lay additional wires, and I have therefore devised the arrangement described hereinafter, in which I use one of the mains, in conjunction with the earth, as the control-circuit.

My invention consists in the several features hereinafter fully described and then pointed out and defined in the claims, reference being had to the accompanying drawings, in which—

Figure 1 is a diagram showing the invention applied to a three-wire system. Fig. 2 is a similar diagram showing its adaptation to a two-wire system with a single meter at each point of consumption.

The reference-numerals 1 and 2 in Fig. 1 indicate two independent meters, having field-coils 3 and 4 and an armature 5, by which a series of registering-dials is driven.

The three mains are denoted by the numerals 6, 7, and 8, and from the positive main a service-wire 9 is tapped off to the field-coil 3 of the meter 1, the wire 10 from the second terminal of said coil going to the coil 3 of the meter 2. From the latter a wire 12 goes to the positive side of the house-circuit, from the negative sides of which a wire 13 is led to the coil 4 in the meter 2, whence a connection is made to the corresponding coil 4 in meter 1, and from the latter to the negative main. A shunt 14 supplies current to one brush and winding of the armature in each meter.

At a suitable point I locate a device consisting of an armature 15, pivoted between electromagnets 16 and 17. The armature 15 carries a bar 18 of non-conducting material, on which are mounted two knives 19 and 20, insulated from each other and adapted to strike into clips 21 and 22 when the electromagnet 16 is energized and into clips 23 and 24 when operated by the magnet 17. From the clips 21 and 23, respectively, wires 25 and 26 are led to the armature-circuits of the meters 1 and 2. The clips 22 and 24 are connected by wires 27 and 28 to the first terminals of the coils of the electromagnets 17 and 16. The second terminals of said coils are connected by wires 29 and 30 to the neutral service-wire 7ª and to the positive service-wire 9. The knives 19 and 20 are connected by wires 31 and 32, the first to the wire 29 and the last to earth, as at G.

At the central station or at any other suitable point is a double-throw switch, consisting of a switch-arm 33, pivoted between clips 34 and 35 on one side, and 36 and 37 on the other side, of the pivotal point. The clips 34 and 36 are connected to each other by a wire 38 and to earth by a wire 39. The clip 35 is connected by a wire 40 to the neutral main 7, and the clip 37 is connected by a wire 41 to the positive main 6. By throwing the switch-arm 33 into the clips 36 and 37 the current will pass from the positive main 6 over wire 41 to clip 37, over switch-arm 33 to clip 36, and thence by wires 38 and 39 to earth. Thence the circuit is completed by the ground to G by wire 32, knife 20, clip 22, wire 27, coil of magnet 17, and wire 29 to the neutral service-wire $7^a$. This draws the armature over to the right of Fig. 1 and strikes the knives 19 and 20 into the clips 23 and 24, which opens the circuit automatically at the clip 22. The circuit for the meter 2 is by the action described established over wire 10, shunt-wire 14, the brushes of the armature and wire 26 to clip 23, knife 19 and wires 31 and 29 to the neutral service-wire $7^a$.

In Fig. 2 I have shown the invention applied to a two-wire system with a single meter, the speed of which is controlled by the insertion of a suitable resistance, whereby the speed and registration are cut down to one-half or such other fraction of the normal rate of speed as will correctly represent the relation of the reduced or special rate to the normal or full rate of charge. The parts are lettered, as in Fig. 1, so far as they correspond in function and arrangement. The only difference that requires notice is the following: The clip 23 is connected by a wire $23^a$ to and through an auxiliary resistance $R^2$ to the wire 25, in which the normal resistance $R'$ is interposed. In the position shown in the figure the circuit for the meter-armature is over wire 9, shunt 14, brushes and armature, wire 25, resistances $R'$ and $R^2$, wire $23^a$, clip 23, knife 19, and wire 31 to the negative service-wire $9^a$. When in the clips 21 and 22, the circuit is over the same path until the point is reached where the resistance $R^2$ unites with the wire 25. At this point the current passes over the wire 25 to the clip 21, and thence by knife 19 and wire 31 to the negative service-wire. The switch-arm 33 in said Fig. 2 is represented as having been thrown at its last movement into the clips 34 and 35 and then withdrawn. While it remains in these clips, the circuit is from the negative side of the system over wire 40, clip 35, switch-arm 33, clip 34, and wires 38 $37^a$ to earth, thence over wire 32 to knife 20, which is assumed to be resting in clip 22 at the moment when the switch-arm 33 is operated. From said clip 22 the circuit is completed over wire 27, winding of magnet 17, and by wire 29 to the positive side of the system. The arm 18 is thereby thrown over into the position shown in Fig. 2 with the knife 20 in the clip 24. If the switch-arm 33 is now thrown into the clips 36 and 37, the circuit will be over wire 41 from the positive side of the system to clip 37, over switch-arm 33 to clip 36, and thence by wires 38 and $37^a$ to earth, then by wire 32, knife 20, clip 24, wire 28, and winding of magnet 16 to the negative side of the system.

By this invention I can use the mains of the system in conjunction with the ground for the control-circuit or any three-wire system in which the neutral wire is not grounded. The expense of drawing in or burying cable for the control-circuit can thus be avoided wherever such expense would be burdensome.

It should be understood that my invention is not limited to the particular method of metering the two rates, as I may use two meters in alternation one with the other, a single meter with speed-controlling means, a pair of meters, one of which runs continuously and the other intermittently, or at the time current is furnished at a special rate, or any form of registering mechanism, one or more, suitable for the purpose. I may also use any type of meter, either mechanical or chemical.

What I claim is—

1. In a system of electrical distribution, the method set forth of controlling the metering or registering devices, which consists in electrically operating a control apparatus from a single point by circuits composed of one or the other of the mains of the system in conjunction with the ground, substantially as described.

2. In a system of electrical distribution, the combination with metering or registering devices arranged at a plurality of points of consumption, of a control apparatus therefor, circuits for the same composed of one or the other of the mains of the system in conjunction with the ground, and means arranged at a single point for closing either circuit momentarily, substantially as described.

3. In a system of electrical distribution, the combination with a series of metering or registering devices, at a series of points where current is consumed, of a series of control mechanisms, one for each of said points, two circuits for said mechanisms, each composed of one of the mains of the system in conjunction with the ground, and means at a single point for momentarily closing one or the other of said circuits, substantially as described.

4. In a system of electrical distribution, the combination with a series of outlying stations of a series of metering or registering mechanisms arranged at said stations, a series of electromagnetic devices suitably located with relation to said metering or registering mechanisms, and control-circuits each consisting of one of the mains and the ground, substantially as described.

5. In a system of multiple-rate metering, the combination with a series of outlying stations, of a series of metering or registering mechanisms at said stations, a series of electromagnetic devices each suitably arranged with relation to the metering or registering mechanism and consisting of an armature pivoted between independent electromagnets and clips for knives carried by an armature-bar, a circuit for each electromagnet including one of the mains of the system and the ground, and a switch at a suitable point to momentarily close either circuit, to control the action of the metering mechanism, substantially as described.

In testimony whereof I affix my signature in presence of two witnesses.

EUSTACE OXLEY.

Witnesses:
GEO. M. COPENHAVER,
EWELL A. DICK.